May 18, 1965 R. A. BERG 3,184,046
DISPLAY CARTON AND DISPLAY PACKAGE
Filed May 31, 1962 6 Sheets-Sheet 1
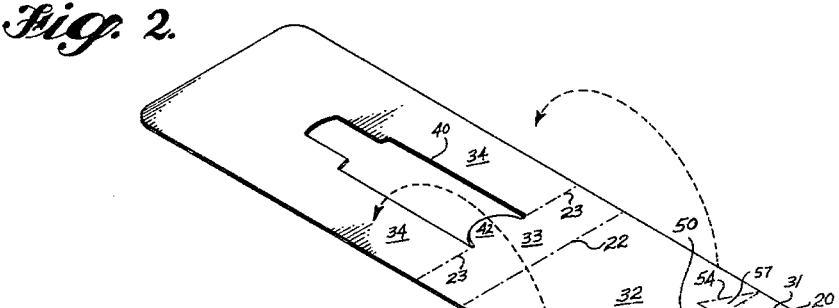
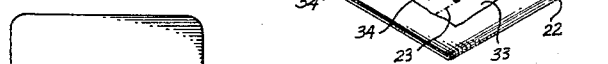
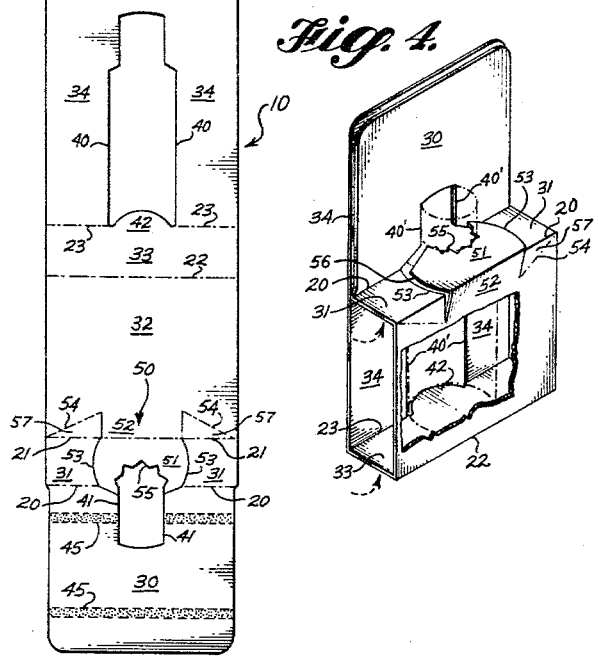
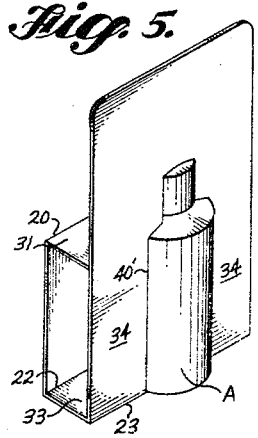
INVENTOR.
ROBERT A. BERG
ATTORNEYS

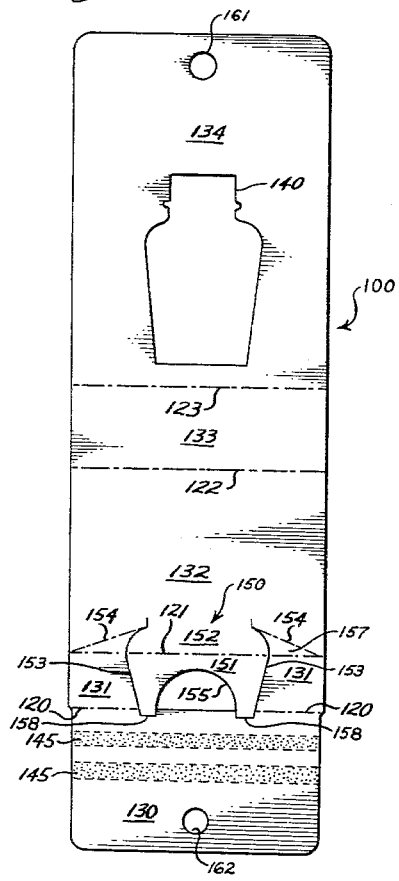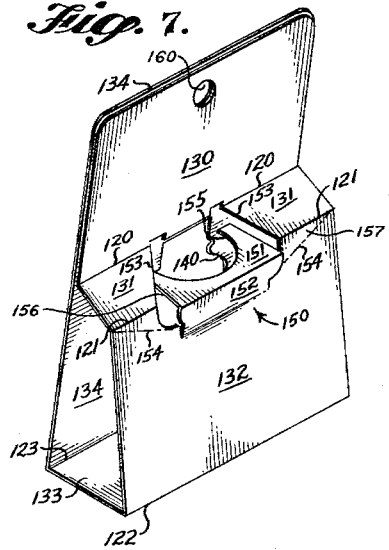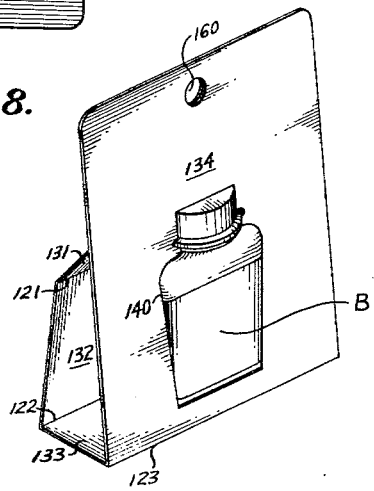

May 18, 1965 R. A. BERG 3,184,046
DISPLAY CARTON AND DISPLAY PACKAGE
Filed May 31, 1962 6 Sheets-Sheet 3

INVENTOR.
ROBERT A. BERG
BY
ATTORNEYS

May 18, 1965 R. A. BERG 3,184,046
DISPLAY CARTON AND DISPLAY PACKAGE
Filed May 31, 1962 6 Sheets-Sheet 4

INVENTOR.
ROBERT A. BERG
BY
ATTORNEYS

May 18, 1965  R. A. BERG  3,184,046
DISPLAY CARTON AND DISPLAY PACKAGE
Filed May 31, 1962  6 Sheets-Sheet 5
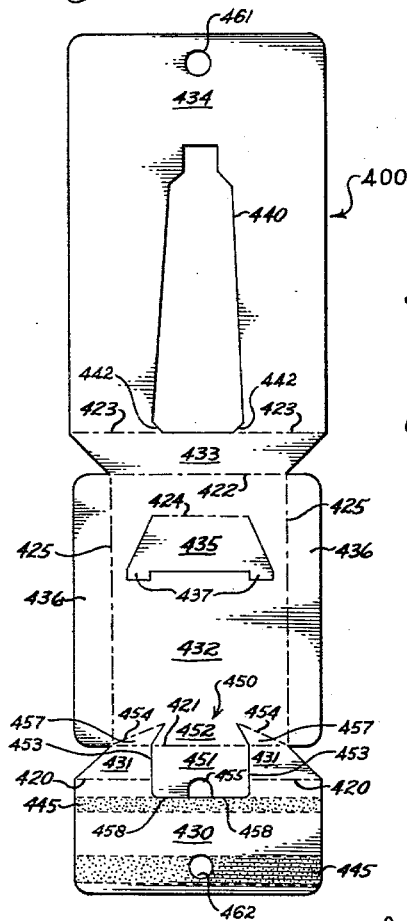
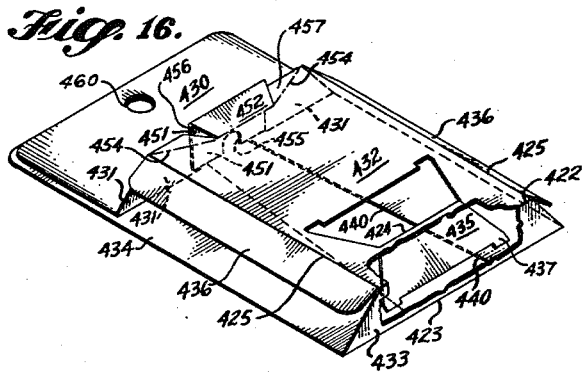
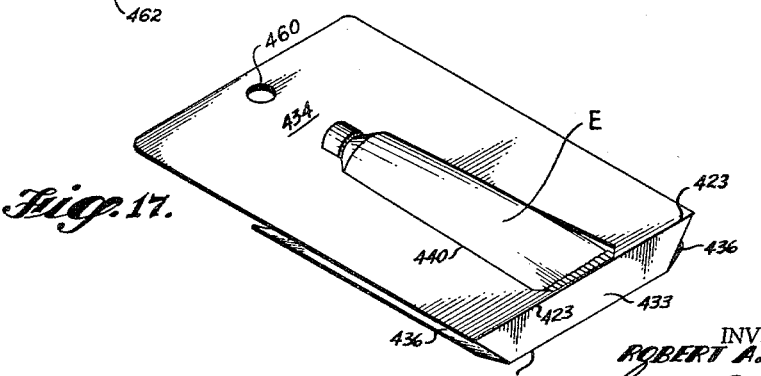
INVENTOR.
ROBERT A. BERG
BY
ATTORNEYS May 18, 1965  R. A. BERG  3,184,046
DISPLAY CARTON AND DISPLAY PACKAGE
Filed May 31, 1962  6 Sheets-Sheet 6
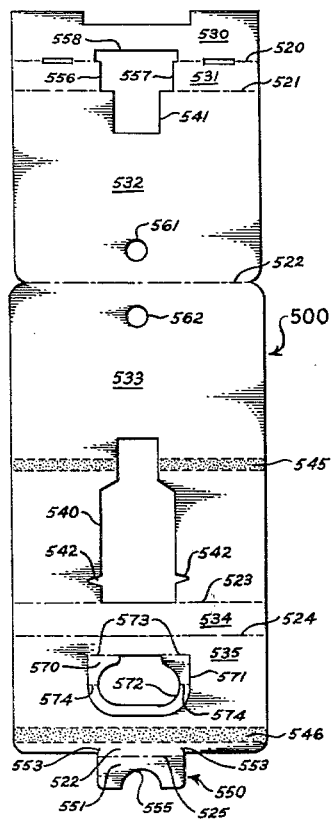
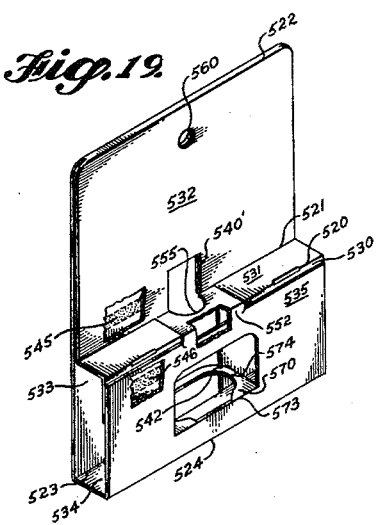
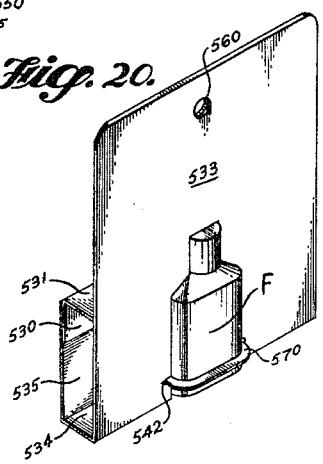
INVENTOR.
ROBERT A. BERG
BY
ATTORNEYS United States Patent Office 3,184,046
Patented May 18, 1965

3,184,046
DISPLAY CARTON AND DISPLAY PACKAGE
Robert A. Berg, Chicago, Ill., assignor to Weyerhaeuser Company, Tacoma, Wash., a corporation of Washington
Filed May 31, 1962, Ser. No. 199,057
14 Claims. (Cl. 206—45.14)

This invention relates to a display carton and a display package.

Cartons and packages for the displaying of articles are becoming increasingly important because of more self-service and, therefore, self-selling in supermarkets, drug stores, and other retail stores. There is a major requirement for articles sold in these stores—the article must not be overlooked either on the shelf or at the check-out stand. A pre-sold customer may be unsold if he cannot readily find the article in the store, and the article may not be in the store if its pilferage rate is high.

These requirements create a twofold problem for a small article because its size may cause it to be overlooked both on the shelf and at the check-out stand, resulting in a low sales rate and a high pilferage rate. Therefore, small articles must be packaged in an attention-attracting manner so that they will be noticed both on the shelf and at the check-out stand. The necessity of attracting attention to the article at the check-out stand and avoiding pilferage also requires that the article remain within the package until it is purchased and, therefore, that the package prevent surreptitious removal of the enclosed article by a non-purchaser. However, the package should allow easy removal of the article by a purchaser, and should allow a view of and, preferably, access to the enclosed article.

The package meeting these requirements should be economical, its manufacture and filling not adding appreciably to the price of the contained article. The carton must then be economical of material and simple of manufacture, and must be easy and inexpensive to fill. It is also desirable that the carton forming and carton filling operations be operated and located independently of each other, and that all carton adhering operations take place at the carton forming location.

It is, therefore, an object of this invention to provide a display carton and a display package capable of independent forming and filling, and also an object of this invention to provide a display carton and a display package in which all the adhering operations take place during the carton forming operation.

It is another object of this invention to provide a display carton and a display package that will allow the article to be placed into the carton simply and easily, and a further object to provide an economical carton that is substantially pilfer-proof.

It is also an object of this invention to provide a display carton and display package which would attract attention to the enclosed article.

A further object this invention is the provision of a display carton and a display package which hinders pilferage of the enclosed article. A still further object of this invention is the provision of a display carton and a display package that will allow access to the article but will prevent ready removal of the article from the package.

Another object of this invention is the provision of a display carton and a display package in which the elements of the carton cooperate to hinder the removal of an enclosed article although allowing access to the article.

The invention has as another object the provision of a display carton and display package in which an element of the carton provides an aperture for the insertion of an article into the carton, and also cooperates with other elements of the carton to retain the article within the carton.

These and other objects of this invention will become readily apparent of a reading of the following specifications in conjunction with the attached drawings.

FIGURE 1 is a top plan view of a blank for one form of the carton.

FIGURE 2 is an isometric view of the blank of FIGURE 1 showing the method of carton formation.

FIGURE 3 is an isometric view of the flat folded carton formed from the blank of FIGURES 1–2.

FIGURE 4 is an isometric view of the rear face of the package formed from the carton of FIGURE 3. Portions of the carton are cut away to show details of construction, and an enclosed article is shown in phantom.

FIGURE 5 is an isometric view of the front face of the package.

FIGURE 6 is a top plan view of a blank for another form of the carton.

FIGURE 7 is an isometric view of the rear face of the erected carton formed from the blank of FIGURE 6.

FIGURE 8 is an isometric view of the front face of the display package formed from the carton of FIGURE 7.

FIGURE 15 is a top plan view of a blank for still another modification of the carton.

FIGURE 16 is an isometric view of a rear face of the erected carton formed from the blank of FIGURE 15. Portions of the carton are cut away to show details of construction.

FIGURE 17 is an isometric view of the front face of the display package formed from the carton of FIGURE 16.

FIGURE 18 is a top plan view of a blank for another form of carton.

FIGURE 19 is an isometric view of the rear face of the erected carton formed from the blank of FIGURE 18 with portions cut away to show details of the construction.

FIGURE 20 is an isometric view of the front face of the display package formed from the carton of FIGURE 19.

Figure 9:
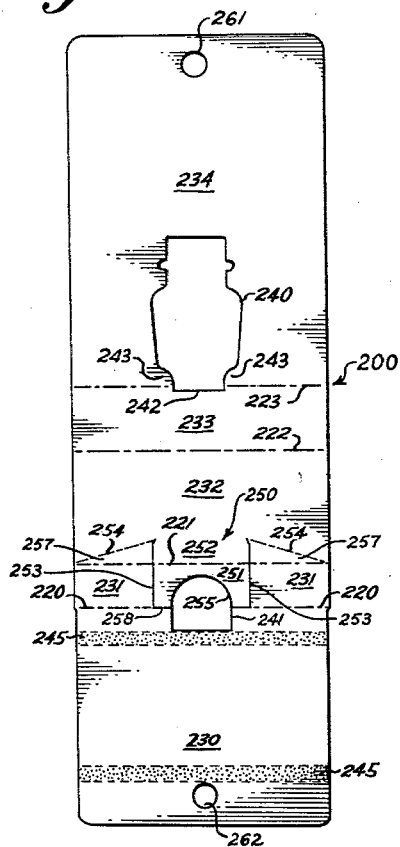
FIGURE 9 is a top plan view of a blank for another modification of the carton.

These six modifications illustrate the manner in which the carton may package articles of various shapes. In each of these packages the article protrudes through an aperture in the front face of the carton. In the preferred form only a portion of the article protrudes through the aperture, which has the shape of a plane or curved section through the article, because the section is through a narrow front portion of the article. This shape also prevents the article from being moved outwardly through the aperture.

The article is held in the front aperture by the rear panel of the carton and by a locking member, which forms a part of the carton body, and is inserted into the carton body through an aperture formed by the locking member. The locking member may also cooperate with the rear panel of the carton body so that the panel may bend around the article and hold the article within the carton. If desirable, other elements may be provided for retaining and holding the article within the carton.

These features may be seen in the carton shown in FIGURES 1–5. This carton, which is used with an article having a cylindrical body connected to a smaller diametered neck and cap by a conical shoulder, is formed from a blank 10, FIGURES 1–2, that is divided by transverse score lines 20, 21, 22, and 23 into an upper rear panel 30, a shoulder panel 31, a lower rear panel 32, a base panel 33, and a front panel 34.

The carton is formed by bending blank 10 around score line 22, bringing the rear panels 30–32 into contiguity with the front panel 34, and adhering the upper rear panel 30 to the upper portion of the front panel 34 along glue lines 45. These glue lines may be on either the rear panel 30 or the front panel 34. The adherence of the front and rear panels also causes the upper portion of aperture 40, formed in the front panel 34, to be contiguous with aperture 41, formed in upper rear panel 30, and to form a single aperture 40′ in the completed carton. This aperture has the dimensions of the smaller of the two apertures 40 or 41, and has the configuration of a flat section through article A forwardly of the center of the article, allowing the article to protrude through aperture 40′ and to be restrained from outward movement by the aperture. The article will protrude through the aperture 40′ after it has been placed within the carton at the article manufacturing site.

The carton is transported to the manufacturing site in lay-flat condition as shown in FIGURE 3, and is squared at the manufacturing site as shown in FIGURE 4. The article A is inserted into it through the loading aperture 56 formed in the shoulder panel 31 and the lower rear panel 32 by a locking member 50. The aperture 56 is large enough to allow the article to pass through it into the body of the carton. The article A protrudes through the aperture 40′ in the front panel 34 of the carton and rests upon the bottom panel 33 and the extension 42 of the carton. The shape of the extension 42 conforms to the shape of the protruding portion of the base of the article.

The article A is held in the front aperture 40′ by the central portion of the lower rear panel 32 and the locking member 50. This member, comprising a retaining member 51 and a spring member 52, is defined by a pair of slits 53 in the shoulder 31 and the lower rear panel 32 of the carton. These slits also define loading aperture 56 which allows the insertion of the article into the carton, and, therefore, the exact shape of the slits 53 and the distance between the slits will depend on the size and the shape of the article. For example, the slits 53 for the capped cylindrical article of FIGURES 1–5 are straight and parallel in panel 32, are convex in panel 31, and converge in panel 30, forming the retaining member 51 in upper rear panel 30 and shoulder panel 31, and the spring member 52 in the lower rear panel 32.

The lower rear panel 32 also has a pair of score lines 54 extending from the upper corners of the panel to the lower ends of slits 53. These score lines, in conjunction with score line 21 and slits 53, define a pair of substantially triangular members 57 that enable the spring member 52 and the central portion of the panel 32 to bow outwardly and enlarge the horizontal dimension of aperture 56 during the insertion of the article into the carton. The outward bowing of the rear panel 32 and member 52 will also apply forward pressure against the body of the article through the panel 32 and against the neck of the article through the retaining member 51 and its serrated inner edge 55. The serrations aid in the removal of the tab that form aperture 41 and edge 55 from the blank.

As shown in FIGURE 4, the pressure exerted on the article by the rear panel 32 and the spring member 52 will depend upon the amount that the panel 32 and the member 52 are bowed outwardly, and, therefore, the distance between the score line 21 and the edge 55 of the retaining member 51 in relationship to the actual distance between the rear panel 32 and the article. In the preferred form of carton, this distance on the retaining member is slightly longer than the actual distance, and causes the spring member 52 to be bent rearwardly and to exert forward pressure on the retaining member 51. Because forward pressure should also be exerted by the panel 32, the distance from the score line 21 to the edge 55 should be only slightly greater than the actual distance. Too great a difference between the two dimensions will also bend the spring member 52 beyond its elastic limit and reduce the amount of pressure that it can exert.

Thus the preferred method of forming and filling the carton is to adhere panel 30 to panel 34, to ship the lay-flat carton to the article manufacturing site, to square the carton at the site, to place the article into the carton through an aperture 56, and to place the edge 55 of the retaining member 51 against the neck of the article and hold the article within the front article aperture 40′. This preferred method may be altered if desired by performing the filling and forming operations in one continuous process. The article would then be placed in the aperture 40 of the blank, the blank would be wrapped around the article, and the panels 30 and 34 would be adhered. This operation would have the usual drawback of performing the gluing operation at the article manufacturing site, and the usual temperature and humidity problems that accompany a gluing operation would be encountered.

The shape of the article in FIGURES 1–5 requires a carton having an aperture 41 in the rear panel 30 which forms, in combination with an aperture 40 in the front panel 34, an aperture 40′, and also requires a shoulder panel 31 which is substantially parallel to the base panel 33. However, the shape of the enclosed article may require that the lower rear panel curve around the article in order to retain the article within the carton, and, therefore, require that the carton have a different shape. Such a carton is shown in FIGURES 6–8.

The article used with this carton is rectangular in cross-section, and requires both a large aperture in the shoulder panel and lower rear panel for its placement into the carton body, and a curved rear panel which cooperates with the front aperture for retaining the article within the carton.

The carton of FIGURES 6–8 is formed from a blank 100 that is divided by transverse score lines 120, 121, 122, and 123 into an upper rear panel 130, a shoulder panel 131, a lower rear panel 132, a base panel 133, and a front panel 134. The carton is formed by adhering the upper rear panel 130 to the upper portion of the front panel 134 along glue lines 145, and is folded flat for shipment to the article manufacturing site by folding the lower rear panel 132 and the base panel 133 upwardly around score lines 121 and 123 until these panels overlay the front panel 134. This places the shoulder panel 131 between the upper rear panel 130 and the lower rear panel 132. This type of flat folding is dictated by the shape of the contained article and the resultant irregular shape of the erected carton.

The carton is erected at the article manufacturing site, and the article B is inserted in the carton through the aperture 156 formed in the shoulder panel 131 and the rear panel 132 by a locking member 150. The article protrudes through an article aperture 140 in the front panel 134. The aperture 140, having the shape of a curved section through the article, is shorter than the article to prevent the article from passing outwardly through the aperture, and the lower edge of the aperture 140 is, therefore, spaced from and preferably parallel to the score line 123 and is above the base of the article in the package, allowing the article base to be held between the front panel 134 and the rear panel 132. The aperture 140, in association with the front panel 134, curves upwardly and rearwardly around the upper front portion of the article, and the upper edge of the aperture 140 is above, and may contact, the top of the contained article.

The article is held within the aperture 140 and against the front panel 134 by the rear panel 132 and the locking member 150. The locking member is divided by the score line 121 into a retaining member 151 and a spring member 152, and is formed in the rear panels 130–132 by a pair of curved outer slits 153 and a curved central slit 155 which extend into panel 130 and are connected at their ends by a pair of straight transverse slits 158, which may be substantially parallel to score line 120. The slit 155 also forms the article contacting inner edge of the retaining member 151, and aids in holding the article within the front aperture 140.

The forward pressure for this holding action is caused by the outward bowing of the spring member 152 and the central portion of lower rear panel 132. The member 152 and the central portion of panel 132 can bow outwardly of the upper edge 121 of the panel 132 because they are separated from the upper side sections of the panel 132 by the curved slits 153 and their downward extensions 158. These extensions are straight and parallel in their preferred form. The rearward movement of member 152 and panel 132 cause the panel 132 to bend around a pair of score lines 154 which extend from the upper corners of panel 132 to the lowermost intersection of the curved slits 153 and the extensions 158. The score lines 154, and score line 121, and the slits 153 define a pair of substantially triangular members 157 in rear panel 132. Members 157 act as a bridge between the panel 132 and shoulder 131 and allow the spring member 152 and the panel 132 to curve around the upper rear corners of the article and aid the aperture 140 to hinder sideways movement of the article within the carton.

The bending action of the lower rear panel 132 is caused in part by the shoulder 131 and its placement with respect to the front panel 134, and lower rear panel 132, and the article B in the erected carton. The shoulder panel 131 slopes rearwardly causing its rear edge 121 to be lower than its front edge 120. In the preferred arrangement, the front edge 120 will be aligned with the upper edge of the aperture 140 and the top of the article, the rear edge 121 will be aligned with the neck of the article, and the shoulder panel 131 will be beside the upper neck or cap portion of the article. The distance between the rear edge 121 and the front panel 134 will be less than the depth of the body of the article, causing the article to force the central portion of panel 132 and member 152 outwardly, curving the panel 132 around the article. This action also pulls the front panel 134 and its associated aperture 140 rearwardly around the article. Thus the article is held in the carton and its outward movement from the carton is hindered.

The carton and its associated article may be hung on a display rack by the aperture 160, FIGURES 7–8, formed by the two aligned apertures 161 and 162 in the front and rear panels 134 and 130, respectively. The two apertures are aligned to form the aperture 160 during the adherence of panel 130 to panel 134.

Figure 11:
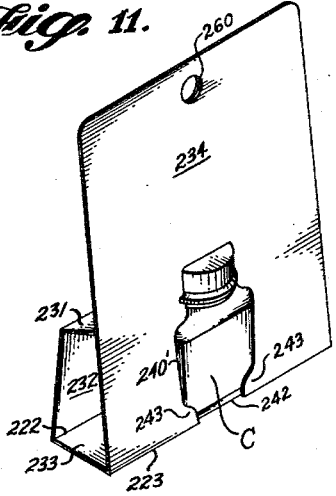
FIGURE 11 is an isometric view of the front face of the display package formed from the carton of FIGURE 10.
Figure 10:
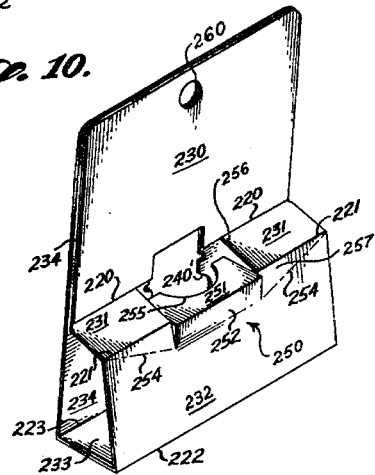
FIGURE 10 is an isometric view of the rear face of the erected carton formed from the blank of FIGURE 9.

The carton shown in FIGURES 9–11 represents a solution midway between those shown in FIGURES 1–5 and FIGURES 6–8. This carton would usually be used with small articles having rectangular cross-sections and having labels that extend to the base of the article. This carton is formed from a blank 200 that is divided by transverse score lines 220, 221, 222, and 223 into an upper rear panel 230, a shoulder panel 231, a lower rear panel 232, a base panel 233, and a front panel 234.

The blank has an aperture 240 in the front panel 234, an aperture 241 in the upper rear panel 230, and a locking member 250 formed in the shoulder panel 231 and the lower rear panel 232. The locking member 250 is divided into a retaining member 251 and a spring member 252 by score line 221, and is formed in the blank by a pair of substantially straight and parallel outer slits 253 and a curved central slit 255 joined at their outer ends by a pair of straight transverse slits 258, coextensive with score line 220. The slit 255 also forms the article contacting edge of the retaining member 251.

The slits 253 separate the member 252 and the central portion of rear panel 232 from the upper side sections of panel 232, and enable them to bow rearwardly of these sections and the upper edge 221 of the panel 232. The bowing action causes the panel 232 to bend around a pair of score lines 254 which extend from the upper corners of rear panel 232 to the lower ends of slits 253. The score lines 254, the score line 221, and the slits 253 form a pair of substantially triangular members 257 which bridges the lower sections of rear panel 232 and the shoulder panel 231 and allow the panel 232 to curve around the article. The rear panel curvature is again aided by the rearwardly sloping shoulder panel 231 which, in the preferred form, has a front edge 220 that is aligned with a central portion of the article cap and a rear edge 221 which is aligned with the neck of the article and which is spaced from the front panel 234 a distance which is less than the depth of the article so that the article C will force member 252 and the central portion of panel 232 rearwardly, pulling the front panel 234 and its associated aperture 240′ rearwardly around the article.

The aperture 240′, formed by the alignment of apertures 240 and 241 in the adherence of panel 230 to panel 234 along glue lines 245, has the shape of an upwardly and rearwardly sloping flat section through the article, and has an extension 242 on its lower end that extends to the base of the article. The extension, which may extend to or beyond score line 223, is narrower than the article and may form a pair of tabs 243 on the front panel 234. These tabs are in front of the article and hold it from forward movement through the aperture 240′. Although this package has many of the features of the package of FIGURES 6–8, it is adopted for an article having a slightly different shape than the article used with the previous carton.

The package may hang from a suitable hook extending through an aperture 260 formed by the aligned apertures 261 and 262 in the front and rear panels 234 and 230.

Figure 12:
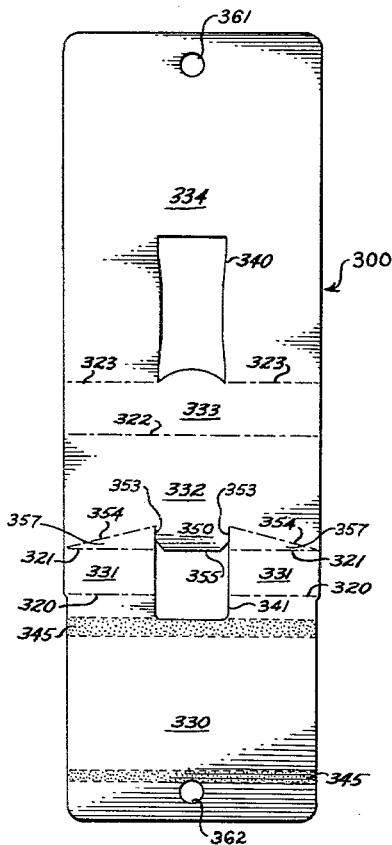
FIGURE 12 is a top plan view of a blank for a further modification of the carton.
Figure 13:
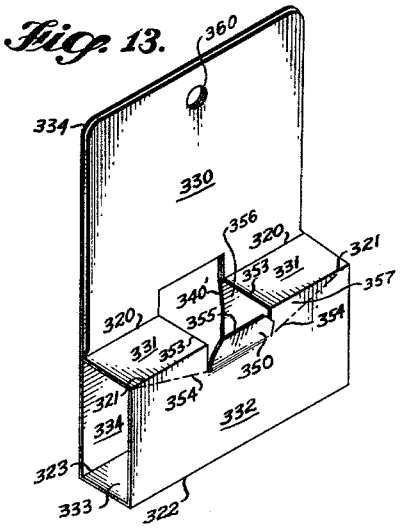
FIGURE 13 is an isometric view of the rear face of the erected carton formed from the blank of FIGURE 12.
Figure 14:
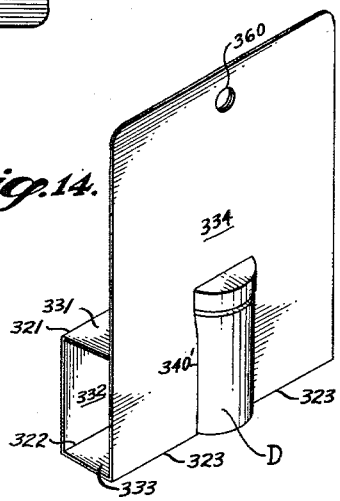
FIGURE 14 is an isometric view of the front face of the display package formed from the carton of FIGURE 13.

The carton for cylindrical articles shown in FIGURES 12–14 may also be hung from an aperture 360 formed by a pair of aligned apertures 361 and 362 in the front and rear panels. This carton is formed from a blank 300 that is divided by transverse score lines 320, 321, 322, and 323 into an upper rear panel 330, a shoulder panel 331, a lower rear panel 332, a base panel 333, and a front panel 334.

The carton is formed in the usual manner by adhering the upper rear panel 330 to the upper portion of the front panel 334 along glue lines 345, and is folded flat for shipment by bending panels 332 and 333 upwardly around score lines 321 and 323, which places the shoulder panel 331 between the upper and lower rear panels 330 and 332. The slight downward and rearward slope of the shoulder panel 331 requires this manner of folding.

The adherence of the rear panel 330 to the front panel 334 aligns an aperture 340 in the front panel with an aperture 341 in the rear panel, forming a front article aperture 340' which has the shape of a flat section through the article. The article is held in the aperture by the lower rear panel 332 and the locking member 350. The locking member 350 is formed in the rear panel 332 by a pair of slits 353, preferably straight and parallel, and has an outer edge 355, preferably aligned with score line 321. The outer corners of the locking member 350 may be beveled if desired.

The slits 353 also separate the locking member 350 and the central section of the lower rear panel 332 from the upper side sections of the panel 332, and enable them to bend outwardly of the upper edges 321 of panel 332. The panel 332 bends around a pair of score lines 354 which extend from the upper corners of the panel 332 to the lower ends of slits 353 and, in conjunction with score line 321 and slits 353, define a pair of substantially triangular members 357 that bridge the shoulder panel 331 and the rear panel 332. The bending action also enlarges the aperture 356 defined by slits 353 in the rear panel 332 and the shoulder panel 331, allowing the article to be placed within the carton.

A carton for flexible tubes, such as tube E, is illustrated in FIGURES 15–17. Again, a blank 400 is divided by score lines 420, 421, 422, and 423 into an upper rear panel 430, a shoulder panel 431, a lower rear panel 432, a base panel 433, and a front panel 434; is formed into a carton by adhering the upper rear panel 430 to the upper portion of the front panel 434 along glue lines 445; and is folded flat for shipment by rotating the lower rear panel 432 and the base panel 433 upwardly around score lines 421 and 423 until they overlay the front panel 434, and the shoulder panel 431 is between the upper and lower rear panels 430 and 432.

The article is again inserted into the carton through an aperture 456 formed in the shoulder panel 431 and lower rear panel 432 by a locking member 450, and is held in an article aperture 440, having the shape of a flat section through the article, in front panel 434 by the central section of rear panel 432 and the locking member 450.

The locking member 450 is divided by score line 421 into a retaining member 451 and a spring member 452, and is formed in the rear panels by a pair of outer slits 453 and an inner curved slit 455 which extend into upper rear panel 430 and are connected at their ends by a pair of transverse slits 458, preferably parallel to score line 420. In the preferred construction, the slits 453 are straight and parallel in panels 430 and 431 and convergent in panel 432. The slit 455 also forms the article contacting edge of retaining member 451.

The article E bows member 452 and the central portion of panel 432 slightly outwardly, bending the panel 432 around score lines 454 which extend from the upper corners of panel 432 to the lower ends of slits 453. The slits 453, the score lines 454, and the score line 421 form a pair of substantially triangular members 457 which bridge the lower section of panel 432 and shoulder panel 431.

The shape of the lower portion of the tube requires an additional member in the carton to hold the tube E in aperture 440. This member is the inner holding flap 435 which is formed in panel 432 and hingedly connected to panel 432 at score line 424, the lower edge of member 435. As shown in FIGURE 16, the member 435 is rotated inwardly and downwardly around score line 424 until the end tabs 437 of member 435 frictionally engage the front panel 434 adjacent score line 423. Thus, member 435 slopes forwardly and downwardly and holds the lower portion of the tube E within aperture 440 and against the corners 442 of the front flap 434. The tabs 437 are at the sides of the aperture 440 so that neither the tabs 437 nor the member 435 is seen from the front of the package.

The panel 432 has a pair of side flaps 436 hingedly connected to its side edges by a pair of longitudinal score lines 425. In the preferred form of carton, the total width of the rear panel 432 and the side flaps 436 is equal to the width of the front panel 434, causing the side edges of the shoulder panel 431 and the base panel 433 to be tapered inwardly from the width of the upper rear panel 430 and front panel 434 to the width of the lower rear panel 432. The side flaps 436 may be turned inwardly, as shown in FIGURE 16, when the package is hung from a suitable hook using the aperture 460 formed by the aligned apertures 461 and 462 in the front and rear panels 434 and 430, respectively. The flaps 436 may also be bent rearwardly around score lines 425 to serve as a stand for holding the carton upright if it is displayed on a shelf or counter.

Another modification is shown in FIGURES 18–20. This carton is formed from a blank 500 that is divided by transverse score lines 520, 521, 522, 523, and 524 into a first lower rear panel 530, a shoulder panel 531, an upper rear panel 532, a front panel 533, a base panel 534, and a second lower rear panel 535.

The blank is moved sideways through a machine in a continuous operation that forms the carton and folds it flat. The glue strips 545 and 546 are placed on panels 533 and 535; the upper rear panel 532 and its associated panels 530 and 531 are rotated around score line 522 until they are contiguous with front panel 533, and the upper rear panel 532 is adhered to the front panel 533 along glue line 545; the panels 530 and 531 are rotated upwardly around score line 521 until they overlay and are contiguous with the rear panel 532; the panel 530 is rotated around score line 520 until it overlays and is contiguous with panel 531; and the base panel 534 and second lower rear panel 535 are rotated upwardly around score line 523 until they overlay front panel 533 and rear panel 530, and the first and second lower rear panels 530 and 535 are adhered together along glue line 546 to form a lower rear panel 535'.

The formation of the carton aligns the aperture 540 in the front panel 533 with the aperture 541 in the upper rear panel 532, forming a front article aperture 540' having the shape of a flat section through the contained article. This aperture also has a pair of aligned triangular side extensions 542 which allow the retention member 570 to project beyond the front face of the front panel 533. The member 570 is formed by a slit 571 in the second lower rear panel 535, and has a central aperture 572 that has a periphery which conforms to the cross-sectional shape of the article. Aperture 572 may extend rearwardly to the hinged connection of the member 570 to the rear panel 535. This connection, score lines 573, is spaced from and parallel to score line 524, and is aligned with the aperture extensions 542 in the erected carton. This connection allows the member 570 to be folded into the erected carton and to project through extensions 542 and forwardly of the front face of front panel 533. A pair of central transverse score lines 574 may be provided in member 570. These score lines permit the member 570 to be positioned in the erected carton.

After the erection of the carton and the positioning of member 570, the article is inserted into the carton through the stepped aperture 556 formed in shoulder panel 531 and rear panel 530. This aperture, having a forward edge that is contiguous with aperture 541, has a narrow section 557 in the shoulder panel 531 and a wide section 558 in the rear panel 530, and is aligned with a locking member 550 that is hingedly mounted on the outer edge of panel 535.

The locking member 550, usually wider than aperture section 557 and narrower than aperture section 558, is divided by a score line 525 into a retaining member 551 and a spring member 552. Spring member 552 is formed in the panel by a pair of score lines 553. It extends from above the outer edge of the panel 535 into the panel 528. The retaining member 551 has an outer curved article contacting edge 555, which is placed against the neck of the article within the carton and holds it within aperture 540'.

The package may be displayed on a rack by using the aperture 560 formed by the aligned apertures 561 and 562 in panels 532 and 533.

Although specific details of preferred embodiments have been set forth above, it will be apparent that many changes and modifications may be made therein without departing from the spirit of the invention. It will therefore be understood that what has been described herein is intended to be illustrative only, and is not intended to limit the scope of the invention.

What is claimed is:

1. A carton for an article, said carton comprising
front and rear panels, and
top and bottom panels extending between said front and rear panels,
said panels defining in the erect carton a space for enclosing a portion of said article,
said front panel having an aperture therein, said aperture having a contour which prevents the outward movement of said article through said aperture,
said top panel having an aperture which is contiguous with said front panel aperture,
a locking member extending from said rear wall, said locking member being aligned with said top panel aperture and being adopted to engage an article,
the said panels and said locking member cooperating to press and hold an article placed in the carton in a protruding position with respect to said front panel aperture.

2. A carton for an article, said carton comprising
front and rear panels, and
top and bottom panels extending between said front and rear panels,
said panels defining in the erect carton a space for enclosing a portion of said article,
said front panel having an aperture therein, said aperture having a contour which prevents the outward movement of said article through said aperture,
said top panel having an aperture which is contiguous with said front panel aperture,
at least a part of said top panel extending below the top of said front panel aperture in the erected carton,
a locking member extending from said rear wall, said locking member being aligned with said top panel aperture and being adopted to engage an article,
the said panels and said locking member cooperating to press and hold an article placed in the carton in a protruding position with respect to said front panel aperture.

3. A carton for an article, said carton comprising
front and rear panels, and
top and bottom panels extending between said front and rear panels,
said panels defining in the erect carton a space for enclosing a portion of said article,
said front panel having an aperture therein, said aperture having a contour which prevents the outward movement of said article through said aperture,
said top panel having an aperture which is contiguous with said front panel aperture,
said rear panel having a pair of slits therein extending downwardly from said top panel aperture and terminating in said rear panel,
the said panels cooperating to press and hold an article placed in the carton in a protruding position with respect to said front panel aperture.

4. A carton for an article, said carton comprising
front and rear panels, and
top and bottom panels extending between said front and rear panels,
said panels defining in the erect carton a space for enclosing a portion of said article,
said front panel having an aperture therein, said aperture having a contour which prevents the outward movement of said article through said aperture,
said top panel having an aperture which is contiguous with said front panel aperture,
said rear panel having a pair of slits therein extending downwardly from said top panel aperture and terminating in said rear panel,
said rear panel having a pair of score lines therein extending from the upper corners of said rear panel to a point on said slits below the top edge of said rear panel,
the said panels cooperating to press and hold an article placed in the carton in a protruding position with respect to front panel aperture.

5. A carton for an article, said carton comprising
front and rear panels, and
top and bottom panels extending between said front and rear panels,
said panels defining in the erect carton a space for enclosing a portion of said article,
said front panel having an aperture therein, said aperture having a contour which prevents the outward movement of said article through said aperture,
said top panel having an aperture which is contiguous with said front panel aperture,
at least a part of said top panel extending below the top of said front panel aperture in the erected carton,
said rear panel having a pair of slits therein extending downwardly from said top panel aperture and terminating in said rear panel,
the said panels cooperating to press and hold an article placed in the carton in a protruding position with respect to said front panel aperture.

6. A carton for an article, said carton comprising
front and rear panels, and
top and bottom panels extending between said front and rear panels,
said panels defining in the erect carton a space for enclosing a portion of said article,
said front panel having an aperture therein, said aperture having a contour which prevents the outward movement of said article through said aperture,
said top panel having an aperture which is contiguous with said front panel aperture,
at least a part of said top panel extending below the top of said front panel aperture in the erected carton,
said rear panel having a pair of slits therein extending downwardly from said top panel aperture and terminating in said rear panel,
said rear panel having a pair of score lines therein extending from the upper corners of said rear panel to a point on said slits below the top edge of said rear panel,
the said panels cooperating to press and hold an article placed in the carton in a protruding position with respect to said front panel aperture.

7. A carton for an article, said carton comprising
front and rear panels, and
top and bottom panels extending between said front and rear panels,
said panels defining in the erect carton a space for enclosing a portion of said article,
said front panel having an aperture therein, said aperture having a contour which prevents the outward movement of said article through said aperture,
said top panel having an aperture which is contiguous with said front panel aperture,
said rear panel having a pair of slits therein extending downwardly from said top panel aperture and terminating in said rear panel,
a locking member extending from the part of said rear panel between said slits, said locking member being adopted to engage an article, the said panels and said locking member cooperating to press and hold an article placed in the carton in a protruding position with respect to said front panel aperture.

8. A carton for an article, said carton comprising front and rear panels, and top and bottom panels extending between said front and rear panels, said panels defining in the erect carton a space for enclosing a portion of said article, said front panel having an aperture therein, said aperture having a contour which prevents the outward movement of said article through said aperture, said top panel having an aperture which is contiguous with said front panel aperture, said rear panel having a pair of slits therein extending downwardly from said top panel aperture and terminating in said rear panel, said rear panel having a pair of score lines therein extending from the upper corners of said rear panel to a point on said slits below the top edge of said rear panel, a locking member extending from the part of said rear panel between said slits, said locking member being adopted to engage an article, the said panels and said locking member cooperating to press and hold an article placed in the carton in a protruding position with respect to said front panel aperture.

9. A carton for an article, said carton comprising front and rear panels, and top and bottom panels extending between said front and rear panels, said panels defining in the erect carton a space for enclosing a portion of said article, said front panel having an aperture therein, said aperture having a contour which prevents the outward movement of said article through said aperture, said top panel having an aperture which is contiguous with said front panel aperture, at least a part of said top panel extending below the top of said front panel aperture in the erected carton, said rear panel having a pair of slits therein extending downwardly from said top panel aperture and terminating in said rear panel, a locking member extending from the part of said rear panel between said slits, said locking member being adopted to engage an article, the said panels and said locking member cooperating to press and hold an article placed in the carton in a protruding position with respect to said front panel aperture.

10. A carton for an article, said carton comprising front and rear panels, and top and bottom panels extending between said front and rear panels, said panels defining in the erect carton a space for enclosing a portion of said article, said front panel having an aperture therein, said aperture having a contour which prevents the outward movement of said article through said aperture, said top panel having an aperture which is contiguous with said front panel aperture, at least a part of said top panel extending below the top of said front panel aperture in the erected carton, said rear panel having a pair of slits therein extending downwardly from said top panel aperture and terminating in said rear panel, said rear panel having a pair of score lines therein extending from the upper corners of said rear panel to a point on said slits below the top edge of said rear panel, a locking member extending from the part of said rear panel between said slits, said locking member being adopted to engage an article, the said panels and said locking member cooperating to press and hold an article placed in the carton in a protruding position with respect to said front panel aperture.

11. A carton for an article, said carton comprising front and rear panels, and top and bottom panels extending between said front and rear panels, said panels defining in the erect carton a space for enclosing a portion of said article, said front and top panels having contiguous apertures therein, said front panel aperture having a pair of aligned side extensions thereon, the contour of said front panel aperture adjacent said top panel aperture preventing outward movement of said article through said aperture at this point, a locking member extending from said rear wall, said locking member being aligned with said top panel aperture and being adopted to engage an article, a retention member hingedly connected to said rear panel, said member being longer than the distance between said front and rear panels and having an article receiving aperture therein, said member being adopted to be pivoted into said carton and to extend through said front panel aperture side extension forwardly of said carton, the said panels and member cooperating to press and hold an article placed in the carton in a protruding position with respect to said front panel aperture.

12. A carton for an article, said carton comprising front and rear panels, and top and bottom panels extending between said front and rear panels, said panels defining in the erect carton a space for enclosing a portion of said article, said front panel having an aperture therein, said aperture having a contour which prevents the outward movement of said article through said aperture, said top panel having an aperture which is contiguous with said front panel aperture, a side panel connected to each of the side edges of the rear panel, said panels having forward and rearward movement in the finished carton, the said front, top, rear and base panels cooperating to press and hold an article placed in the carton in a protruding position with respect to said front panel aperture.

13. A carton for an article, said carton comprising front and rear panels, and top and bottom panels extending between said front and rear panels, said panels defining in the erect carton a space for enclosing a portion of said article, said front panel having an aperture therein, said aperture having a contour which prevents the outward movement of said article through said aperture, said top panel having an aperture which is contiguous with said front panel aperture, a locking member extending from said rear wall, said locking member being aligned with said top panel aperture and being adopted to engage an article, a pressure panel hingedly connected to said rear panel and being pivotable into said carton, the length of said pressure panel being greater than the distance between said hinged connection and the juncture of the base and rear panels, the said panels cooperating to press and hold an article placed in the carton in a protruding position with respect to said front panel aperture.

14. A carton for an article, said carton comprising front and rear panels, and top and bottom panels extending between said front and rear panels, said panels defining in the erect carton a space for enclosing a portion of said article, said front panel having an aperture therein, said aperture having a contour which prevents the outward movement of said article through said aperture, said top panel having an aperture which is contiguous with said front panel aperture, said rear panel having a pair of slits therein extending downwardly from said top panel aperture and terminating in said rear panel, a locking member extending from the part of said rear panel between said slits, said locking member being adopted to engage an article, a pressure panel hingedly connected to said rear panel and being pivotable into said carton, the length of said pressure panel being greater than the distance between said hinged connection and the juncture of the base and rear panels, the said panels and said locking member cooperating to press and hold an article placed in the carton in a protruding position with respect to said front panel aperture.

References Cited by the Examiner
UNITED STATES PATENTS

| | | | |
|---|---|---|---|
| 2,274,253 | 2/42 | Howell | 206—45.14 |
| 2,642,988 | 6/53 | Freeman | 206—45.14 |
| 2,654,470 | 10/53 | Borucki | 206—45.14 |
| 2,805,033 | 9/57 | Rous | 248—174 |
| 2,806,608 | 9/57 | Collura | 248—174 |
| 2,854,135 | 9/58 | Pantalone | 206—79 |
| 3,050,183 | 8/62 | Mueller | 206—45.14 |

THERON E. CONDON, *Primary Examiner.*

FRANKLIN T. GARRETT, EARLE J. DRUMMOND,
*Examiners.*